May 5, 1959 P. T. PILEGGI 2,885,581
ARRANGEMENT FOR PREVENTING DISPLACEMENT OF STATOR END TURNS
Filed April 29, 1957
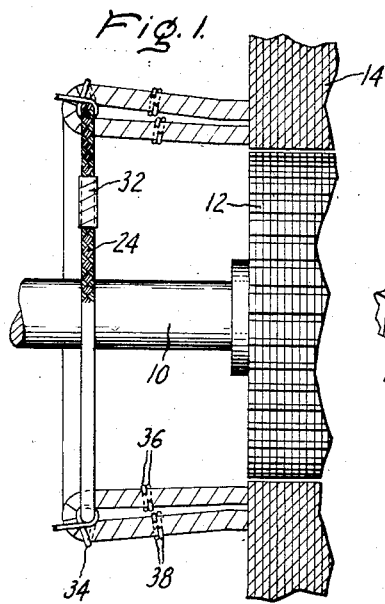
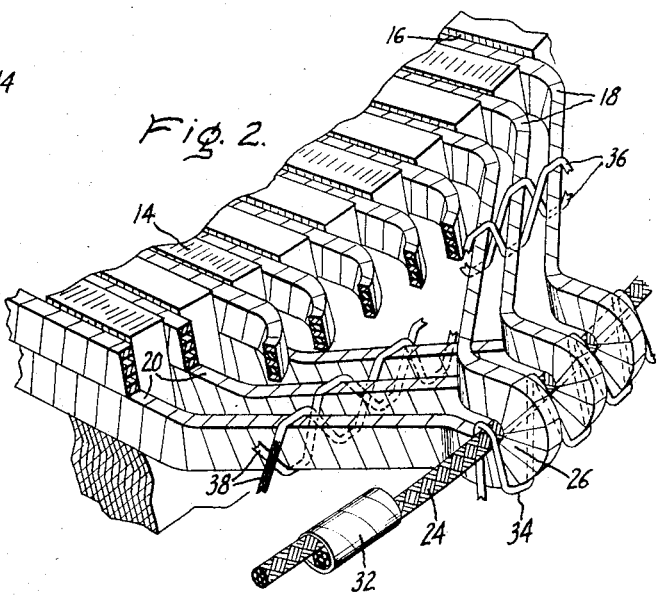
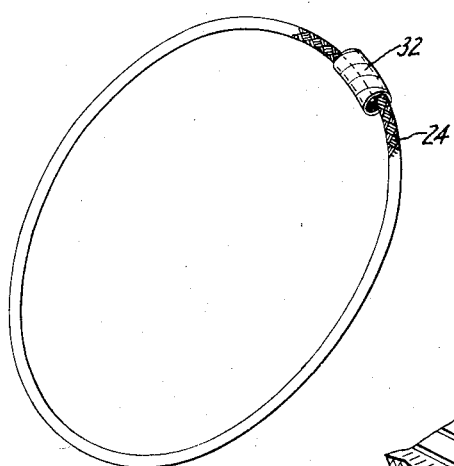
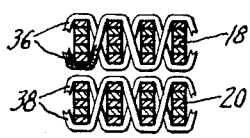
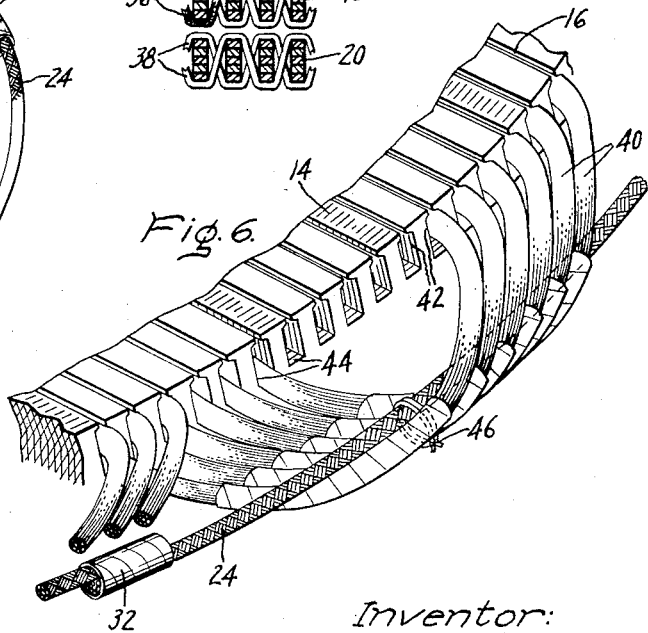
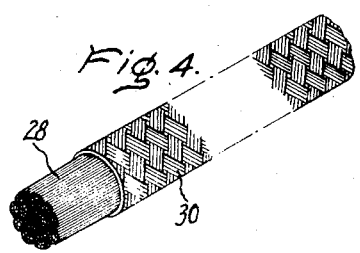
Inventor:
Peter T. Pileggi,
by Vernon F. Kalb
His Attorney.

United States Patent Office 2,885,581
Patented May 5, 1959

2,885,581

ARRANGEMENT FOR PREVENTING DISPLACEMENT OF STATOR END TURNS

Peter T. Pileggi, Charlton, N.Y., assignor to General Electric Company, a corporation of New York Application April 29, 1957, Serial No. 655,667

6 Claims. (Cl. 310—260)

The invention described herein relates to dynamoelectric machines and more particularly to an improved arrangement for preventing radial and peripheral displacement of coil end turns extending from the stator winding during operation of the machine.

In the operation of dynamoelectric machines, such as large induction motors which are subjected to frequent and rapid reversals in rotor rotation, large surges of current flow in the stator coils or winding during such reversals or overload conditions. This abnormal current flow creates strong magnetic fields surrounding the coil end turns which tend to physically move adjacent end turns both in a radial and peripheral direction. Repetitive movement of these parts is especially harmful in machines having more than one coil per slot since the coil end turns overlap or cross one another after leaving the slot and the magnetic forces are usually of sufficient size to cause the adjacent turns to contact one another and ultimately wear the insulation at the points of contact, thus reducing the dielectric strength which eventually results in a short circuit in the motor. As the machines increase in size, the coil currents likewise increase, thus establishing more powerful magnetic fields which cause even greater displacement of the end turns and thereby increasing the likelihood of eventual machine failure because of inadequate insulation.

In order to eliminate these disadvantages inherent in machines of approximately 75 kva. or greater, resort in the past was made to providing tailor-made wedges of wood which were normally positioned and secured between adjacent end turns so as to block the latter against movement by the magnetic forces and to prevent their contacting one another. This solution proved reasonably satisfactory, and aside from the fact that the wedges often loosened, that part of the total machine cost that could be attributed to labor for this particular aspect of the manufacturing process became prohibitive. The development of new thermosetting resins resulted in improved techniques for securing the end turns against movement, and in one embodiment, ropes of inorganic materials were impregnated with a resin and then wound around and tied to the end turns in a manner to reduce the amount of displacement when the stator end turns were subjected to the large magnetic forces. In another modification, ropes similarly treated, were forced between the end turns and upon hardening of the resin, an effective impediment was established against movement of superimposed end turns toward one another. The particular advantages derived from the use of the new materials is that when the resin is cured at low temperatures, it forms a solid substance presenting great resistance to compressive forces, thereby assuring complete separation of the adjacent end turns at the point where they cross one another after leaving the stator slots.

The objections to the use of tailor-made blocks of wood is obvious because of the expensive construction, and the more recent developments, although providing reasonable protection against radial movement toward one another at the crossover points, do not limit the movement of end turns in an outward and/or peripheral direction. It has been found that in order to preclude movement of the end turns in both a radial and peripheral direction, it is necessary to hold them in a fashion to provide structure which acts as though it were a complete integral unit.

It therefore is an object of the invention to eliminate the above-noted disadvantages of the prior art by providing an inexpensive means of affording reinforcement for coil end turns in order to prevent radial and peripheral displacement thereof during operation of the machine.

In carrying out the above object of my invention, I provide a length of glass roving impregnated with a thermosetting resin and fashioned in the shape of a ring for positioning within the nose of coil end turns projecting outwardly from the stator. Upon securing the ring in position, radial displacement of the end turns, either inwardly or outwardly, is precluded by the restraining force presented by the rigid body of the ring. Movement of the end turns in a peripheral direction however, is accomplished by utilizing a rope consisting of inorganic fibers also impregnated with a thermosetting resin which is affixed to the ring at the point where it leaves each side of each end turn. When the resin sets, a firm bond is established between the resin of the rope and the ring thus providing an obstruction to movement of the end turns peripherally. Where the end turns are long, as in large machines, peripheral displacement is restricted by wrapping straps of resin impregnated material alternately over the inner and outer surfaces of each group of end turns lying in a circular plane so as to form an X between adjacent turns in each group and thereby hold or bind them in a rigid and compact unit.

While the specification concludes with claims particularly pointing out and distinctly claiming the subject matter which I regard as my invention, it is believed the invention will be better understood from the following description taken in connection with the accompanying drawing in which:

Figure 1 is a view in elevation, partly in section, of a portion of a dynamoelectric machine illustrating application of the invention to stator end turns;

Figure 2 is a perspective view, partly in section, illustrating the arrangement of a ring in the nose of end turns and a strap of binding material between the end turns and the laminated stator;

Figure 3 is a view of the ring shown in Figure 2 for preventing radial movement of the end turns;

Figure 4 is an enlarged view of a portion of the ring shown in Figure 3;

Figure 5 is a view illustrating the arrangement used in binding the end turns against peripheral displacement; and Figure 6 illustrates the application of the ring shown in Figure 3 to a random wound stator.

Referring now to the drawing, wherein like reference characters designate like or corresponding parts throughout the several views, there is shown in Figure 1, part of a motor comprising a shaft 10 supporting a rotor 12 adapted for rotation within a stator 14. The stator is of conventional and well known construction and includes a plurality of slots 16 each respectively receiving a pair of insulated coils 18 and 20 arranged for electrodynamic cooperation with the rotor. Form wound coils having overlapping end turns are shown to illustrate the teachings of the invention, although it will be apparent that the invention has application equally as well in other structures, such as a rotor for a dynamoelectric machine where centrifugal forces also are encountered.

As is noted in the foregoing discussion, the stator end turns are subjected to large magnetic forces resulting from high current surges, particularly when the machine is carrying out a rotor reversing cycle. If the end turns were not blocked, the magnetic forces would be of sufficient intensity to either draw adjacent end turns toward one another or force them apart depending on the flux distribution in the magnetic field. This unwanted action is eliminated in the present invention by inserting a ring 24 in the nose 26 of the coil end turns comprising the machine winding. The ring 24 consists of a plurality of parallel or woven glass strands 28 enclosed within a braided casing 30, all of which is impregnated with a thermosetting resinous material. Preferably, the braided casing also is made from a plurality of strands, wherein each of the strands comprises substantially parallel glass fibers, woven in a manner to obtain a closely-knit construction as illustrated in Figure 4. As hereinafter described, the thermosetting resin is of a type capable of solidifying into a rigid and compact mass when cured, either with or without the application of heat. The ring 24, treated in the manner described above, is initially soft and pliable and is inserted in the nose of the end turns 18 as the coils are being placed and secured in position in the stator slots 16. The loose ends of the ring 24 are bound together prior to insertion of the last several coils, and enclosed within a reinforcing roving 32 consisting of stranded glass fibers impregnated with a thermosetting resin similar to that used in the ring so as to obtain a firm bond between the joined ring ends. When the thermosetting material is set, or caused to be set by the application of heat, it assumes a perfectly rigid characteristic and contains sufficient strength to withstand the forces applied thereto as a result of end turn movement.

The section diameter of ring 24 is substantially the same as the size of opening in the involute or nose of the coil so as to facilitate its insertion in the end turns and to eliminate the need for positively securing it in position. As aforementioned, the ring material is soft and pliable during installation because of the semi-cured condition of the resin and this feature permits it to assume a configuration compatible with the opening into which it is inserted, and the tacky consistency of the resin on the glass fibers also serves to hold it in the end turn nose until the resin is cured to a hard and rigid body.

The distance between adjacent end turns at the point where ring 24 passes therethrough is approximately the same as that appearing between the stator slots, and while the drawing illustrates this distance as relatively large, in actuality, it is quite small. Advantage of this fact is taken by utilizing the space between adjacent turns for obstructing movement of the end turns in a peripheral direction. This is accomplished by weaving cordage or a rope-like member 34 across the body of the ring 24, outwardly therefrom and around the end turn, as shown in Figure 2, and then back over the ring once again until all of the end turns have been contacted. The cordage is likewise made of strands of glass fibers impregnated with a thermosetting resin which is effective in forming a firm bond between the ring and the cordage when the resin sets. Obviously, the ring alone can be used for preventing radial displacement because of the bonding action between the ring and end turns and because the configuration of the nose of the end turns will hold the ring in position, as shown in Figure 1.

In operation, with the ring positioned in the nose of the end turns and cordage 34 wrapped thereover in the manner illustrated and described, movement of the coil end turns in a radial direction as a result of the sudden appearance of large magnetic forces is now precluded by the rigid construction of ring 24. Since the ring is firmly bonded in position, the complete end turn structure is rigidly braced at a plurality of points around the stator thereby establishing a strong unit capable of resisting the maximum magnetic forces capable of being developed about the coil end turns by the machine. Peripheral displacement of the coils is obstructed by virtue of the cordage 34 wrapped over the ring and around each end turn. A firm bond between the cordage and ring 24 is created upon setting of the resin and since the distance between adjacent end turns is small as compared with the diameter of the cordage, the slightest peripheral movement of the end turns causes them to contact the cordage bound to the ring and thereby limit movement in this direction. The combined action of the ring and cordage effectively prevents displacement of the end turns in any direction while simultaneously utilizing inexpensive materials capable of being installed in a fraction of the time necessary for prior constructions. In the case of rotors the ring easily handles centrifugal forces in addition to the magnetic forces created during operation.

In machines of larger size however, where the distance between the stator and tip of the end turns is long, supplemental bracing or blocking means may be necessary for preventing the intermediate portions of the end turns from contacting one another. Figures 2 and 5 illustrate such an arrangement and consists of a pair of straps 36 made of glass fibers and impregnated with a resin in the same manner as that previously described for ring 24. The straps are alternately wound over the inner and outer surface of the conductors as the coils are placed in the slots during assembly of the machine. Wrapping of the straps on the end turns as assembly proceeds simplifies the work because the clearance between the inner row of coils 18 and the outer coils 20 is sufficiently small as to complicate the wrapping process if performed after all the coils are placed in the slots. As is apparent, a pair of straps 36 are wound over the inner row of coils 18 while a second pair 38 is utilized for wrapping coils 20 in the outer row. Figure 5 illustrates the arrangement of straps on the end turns, which forms an X therebetween, after the coils are located in the slots. Upon completion of this wrapping process and curing of the resin, the straps assume a rigid construction, filling the space in a small area between adjacent bars and tightly binding the end turns in each row into a substantially inflexible unit. Obviously, a single strap could be wound around the end turns and still provide the X-shaped barricade between adjacent coils.

In the preceding description of ring 24, it was shown that radial movement of the end turns was obstructed because of the function served by the ring. The addition of straps 36 and 38 effectively restricts end turn displacement in a peripheral direction by virtue of the strong bond firmly tying all end turns in each row into an integral unit and because the straps constitute a physical impediment to movement. In some cases where the end turns are exceptionally long, it may be preferable to utilize straps at two or more locations between the ring 24 and the stator. Also, cordage 34 may or may not be used in addition to the straps 36 or 38. Normally, the cordage is employed with small machines not requiring the use of straps intermediate the end turns. As the machines increase in size, one or more rows of straps are applied to the end turns for achieving the desired protection against peripheral displacement.

The modification shown in Figure 6 illustrates the application of ring 24 to a stator provided with a random winding. As shown in this figure, the coils 40 leave the inner portion 42 of a slot and enter the outer portion 44 of one located a predetermined distance around the stator. These coils are not provided with the same shape of end turns as that shown in Figure 2, but the ring 24 is just as effective in preventing radial and peripheral end turn movement. After the ring is installed in position, it is tied at spaced points to an end turn by a rope 46 or similar material and the complete unit is then equipped with a varnish which upon curing serves to mold the end ring 24 rigidly to the inner surface of each of the end turns in the random wound stator.

The impregnated glass roving which has been used in the practice of this invention consists of individual lengths of glass fibers impregnated with the thermosetting resinous composition such as a combination of high polymeric material, such as polyvinyl formal or other polyvinylal resins, and a heat reactive thermosetting polyester resin is used as the impregnating composition. By a high polymeric material is meant a resinous material of high molecular weight which is in its final state of polymerization or condensation, and which, upon being cast from solution, yields products of high tensile strength and toughness.

The use of a high polymeric solid material imparts toughness to the thermosetting resin which is usually brittle, and consequently results in a roving which withstands the shocks, vibrations, and bending stresses encountered during use. Examples of such high polymeric materials and particularly polyvinylal resins, which may be used in the practice of this invention, may be found in U.S. Patent 2,307,588, Jackson et al. and Reissue Patent 20,430, Morrison et al., both of which are assigned to the assignee of the present invention.

The following impregnating composition has been found to be effective to accomplish the desired results: (1) a polymerizable unsaturated alkyd resin obtained by the esterification reaction of a mixture of ingredients comprising a polyhydric alcohol and an alpha unsaturated alpha-beta polycarboxylic acid, e.g., diethylene glycol maleate; (2) a copolymerizable different monomer, e.g., styrene, polyesters compatible with the above unsaturated alkyd resin obtained by esterification of allyl alcohol with a polybasic acid, specifically a polycarboxylic acid, e.g., diallyl phthalate, etc., in the ratio, by weight, of about 1 part to 3 parts of (1); (3) a catalyst for accelerating the copolymerization of the ingredients of (1) and (2), e.g., benzoyl peroxide; (4) a polyvinyl acetal resin, specifically a polyvinyl formal resin, in an amount corresponding to from 15 to 75 percent, by weight, of the total of (1), (2) and (4); (5) a volatile solvent for the ingredients of (1), (2) and (4), e.g., ethylene dichloride, a mitxure of ethyl alcohol and 1-nitropropane, a mixture of ethyl alcohol and toluene, etc.; and (6) an inhibitor such as quinone or hydroquinone in an amount of approximately .001 percent to .01 percent of the weight of the reactive materials of (1) and (2). The amount of solvent to be used is between 5 and 20, preferably 10, times the amount of the polyvinyl formal resin in the composition.

An epoxy resin of the type disclosed and claimed in U.S. Patents 2,324,483 and 2,444,333, Castan, both of which are assigned to the same assignee as this invention, alternatively may be used in place of the resin described above.

In lieu of using the glass roving, it will be apparent that roving having similar characteristics can just as well be employed. For example, spun yarn, including cotton and wool fibers or the like, woven tape cut into strips or any other type of natural or synthetic fibers having a tensile strength substantially equal to that of the glass fibers serve as effective substitutes.

In order to determine the effectiveness of a resin impregnated ring positioned in the nose of end turns in the manner described above, rapid reversal tests were carried out on substantially identical 2-pole, 3 phase, 3600 r.p.m., 100 h.p., motors. The tests were designed to subject the motors to the foreseeeable maximum abuse that would be imposed during service and included reversing both motors every 16 seconds by applying full voltage reversed phase sequence. Reversing the machines in this manner subjected them to maximum mechanical stress, dielectric stress and thermal aging simultaneously. The results show that the motor equipped with the reinforcing ring withstood at least 12 times the number of reversals as the one without such a ring and after several weeks of continuous testing, the motor was disconnected to permit the test facilities to be used for other purposes.

In view of the above, many modifications and variations are possible in light of the above teachings. It therefore is to be understood that within the scope of the appended claims the invention may be practiced otherwise than as specifically described.

What I claim as new and desire to secure by Letters Patent of the United States is:

1. A dynamoelectric machine having a plurality of coils positioned in magnetic core slots and end turns extending outwardly therefrom, the improvement comprising a member impregnated with a thermosetting resinous material secured in contact with said coil end turns for preventing displacement in a radial and peripheral direction.

2. A dynamoelectric machine having a plurality of coils positioned in slots provided in a magnetic core and end turns extending outwardly from said coils, the improvement comprising a member positioned within a loop formed by said end turns for preventing movement thereof in a radial direction, and means on said end turns between said member and said core for preventing displacement of said end turns in a peripheral direction.

3. A dynamoelectric machine having a plurality of coils positioned in slots provided in a magnetic core and end turns extending outwardly from said coils, the improvement comprising a ring of rigid material positioned in the nose of said end turns and capable of precluding radial displacement thereof during operation of said machine, and means on opposite sides of each of said end turns and attached to said ring for preventing movement of said end turns in a peripheral direction.

4. A dynamoelectric machine having a plurality of coils positioned in slots provided in a magnetic core and end turns extending outwardly from said coils, the improvement comprising a ring impregnated with a thermosetting resin positioned in the nose of each of said end turns for preventing radial displacement of said end turns, a strap of material likewise impregnated with a thermosetting resin wrapped on and successively engaging each of said end turns for precluding peripheral movement thereof during machine operation.

5. A ring for supporting the end turns of a dynamoelectric machine against lateral displacement comprising a plurality of parallel glass fibers enclosed in a braided sheath and impregnated with a thermosetting resinous material, said material comprising an unsaturated alkyd resin, a diallyl ester of a dicarboxylic acid, said alkyd resin and said diallyl ester being present in the ratio of from 1 to 3 parts, by weight, of said resin per part of said ester, a catalyst for accelerating the copolymerization of said alkyd resin and said ester, a polyvinyl formal resin in the amount corresponding to from 15 to 75 percent, by weight, of the total of said alkyd resin, said diallyl ester and said polyvinyl formal resin, a volatile solvent for the composition and an inhibitor to prevent the polymerization of the composition at room temperature.

6. A member for a dynamoelectric machine comprising a plurality of coils positioned in magnetic core slots and end turns extending outwardly therefrom, a continuous ring positioned in the nose of said end turns for preventing radial displacement thereof during operation of the machine, said ring comprising a plurality of strands joined together for forming the body of said ring, a braiding sheath enclosing said body and likewise made from a plurality of strands, each of said strands comprising a plurality of substantially parallel inorganic fibers impregnated with the thermosetting resinous material so that upon insertion of said ring in the nose of the end turns and curing of the resinuous material, the ring becomes rigid and contains sufficient strength to withstand the forces imposed thereon by the end turns.

References Cited in the file of this patent
UNITED STATES PATENTS

| | | |
|---|---|---|
| 995,441 | Dandliker | June 20, 1911 |
| 2,747,118 | Coggeshall et al. | May 22, 1956 |
| 2,774,899 | Zeissler | Dec. 18, 1956 |